United States Patent Office 3,245,935
Patented Apr. 12, 1966

3,245,935
PROCESS FOR PREPARING AQUEOUS DISPERSIONS OF CHLOROSULFONATED POLYETHYLENE
Chester Arthur Hargreaves II, Louisville, Ky., and Arthur Nersasian, New Castle, Del., assignors to E. I. du Pont de Nemours and Company, Wilmington, Del., a corporation of Delaware
No Drawing. Filed July 18, 1961, Ser. No. 125,634
12 Claims. (Cl. 260—29.6)

This invention relates to a process for preparing elastomers of chlorosulfonated polyethylenes and more particularly to aqueous dispersions of such elastomers. Specifically this invention relates to a process for preparing aqueous dispersions of certain salts of polyethylene chlorosulfonates and their aqueous dispersions.

Chlorosulfonated polyethylene elastomers make excellent lacquer and paint vehicles because of their light color, color stability and resistance to weathering, including the effects of oxygen and ozone. Such elastomers generally are applied in the form of organic solvent solutions. Upon evaporation of the solvent, the films formed are usually cured by heating. Recently the chlorosulfonated polyethylene elastomers have become available in the form of aqueous latex-like dispersions. These aqueous dispersions, which are cheaper to prepare and more readily applied than the elastomer-solvent solutions, are the subject of assignee's U.S. Patents 2,809,950 and 2,968,637. These aqueous dispersions make suitable vehicles for paints, e.g., house paints, but it has been found that the dispersions are only moderately stable. Moreover, the aqueous dispersions have to be cured at elevated temperatures, generally in the presence of curing agents, or aged at ordinary temperatures for long periods, to attain their optimum properties. It is particularly important that vehicles for paints possess excellent stability characteristics because of the varied climatic and other conditions under which paints are marketed and used.

It is therefore an object of this invention to provide a novel process for preparing aqueous dispersions. Another object is to provide a process for preparing aqueous dispersions of salts of chlorosulfonated polyethylenes. A further object is to provide such a process wherein the particle sizes of solids in the aqueous dispersion can be controlled within certain limits. Yet a further object is to provide such a process wherein the aqueous dispersions form high tensile films without curing. A specific object is to provide such a process for preparing stable aqueous dispersions. A related object is to provide such a process wherein the aqueous dispersions are made without the use of surface-active agents. Yet another object is to provide a process for preparing aqueous dispersions which form flexible, coherent films having certain properties similar to those of the cured original chlorosulfonated polyethylene starting material. Still other objects will be apparent from the following description of the invention.

The foregoing objects are achieved in accordance with this invention by dissolving in a water-miscible solvent more volatile than water, e.g., tetrahydrofuran, a salt of a polymeric sulfonic acid derived from a chlorosulfonated polyethylene containing 0.5 to 1.8% by weight sulfur and 10 to 48% by weight chlorine, the cationic constituent of said salt being selected from the group consisting of lithium, sodium, potassium, ammonium and substituted ammonium, adding, in at least one increment, water and a precipitant compound miscible with and more volatile than water selected from the group consisting of methanol, ethanol, isopropanol and acetone in an amount to form an opalescence but less than that required to form a precipitate, and distilling off said solvent and said precipitant compound to form an aqueous dispersion.

The aqueous dispersions of this invention may be substantially transparent having a slight opalescence with particle diameter sizes in the order of 0.001 to 0.01 micron; may have an intermediate degree of opalescence, the particle diameter sizes ranging from 0.001 to 1.0 micron; or the dispersions may be thickly milky, like rubber latex, with the size of the particles ranging from 0.02 to 4.0 microns in diameter.

The aqueous dispersions with the extremely small particles occur as indicated when the dispersions prior to distillation are only faintly opalescent. This occurs when the ratio of water to the precipitant compound is comparatively high, generally greater than 2 to 1, and the amount of precipitant added at any one time is less than that required to produce a definite opalescence or milkiness in the solution. On the other hand, the latex-like aqueous dispersions, i.e., with particle sizes ranging from 0.02 to 4.0 microns in diameter, occur when the ratio of water to precipitant is less, e.g., in a ratio of 0.2 to 1 to 1.25 to 1. The aqueous dispersions having intermediate size particles of course are prepared by controlling the degree of opalescence between the ranges set forth above.

The amount of water added during the process controls the strength of the aqueous dispersion. For example, an equal weight of water is added to obtain a fifty percent aqueous dispersion. In practice, generally slightly more water is added than is desired in the final aqueous dispersion because a small percentage of water is removed during the distillation. It is possible to adjust the concentration of the aqueous dispersions further by adding additional water or by further distillation.

In general, the order of addition of the water and precipitant to the chlorosulfonated polyethylene-solvent solution is not particularly critical. When salts of ammonium, substituted ammonium, e.g., hydroxyalkylammonium, alkylammonium, etc., and mixed salts of an alkali metal, i.e., sodium, potassium and lithium, with the aforementioned cations wherein the ratio of amino nitrogen to alkali metal atoms is about 2 to 1 or more are utilized, all the water may be added first, followed by the precipitant compound until no further opalescence or milkiness develops in the solution. In like manner, the precipitant may be added first or the water and precipitant added simultaneously. It is critical to the invention, however, that no precipitation occur.

In the case of the alkali metal salts (sodium, potassium and lithium) of chlorosulfonated polyethylene, the order of addition of the water and precipitant in order to form the latex-like aqueous dispersion (particle size of 0.02 to 4.0 microns in diameter) is critical. In this embodiment, a part of the water, i.e., 6 to 60% by weight, is added first with or without an amount of the precipitant present in the solution (but not enough precipitant compound to cause precipitation), after which increments of water and precipitant are added whereby the solution becomes increasingly milky. Each additional increment is of such a concentration that it produces a thick milkiness rather than the slight opalescence characteristic of the small size particles or a precipitate. Generally to insure that no precipitate forms, the ratio of water to precipitant increases with each increment added. The water and precipitant may be added in the correct ratio continuously or may be added stepwise.

This invention will now be illustrated by but is not limited to the following examples in which the parts are by weight unless otherwise stated:

*Example I*

Polyethylene having a density of 0.915 and a melt index of 10 is chlorosulfonated as described in U.S. Patent 2,586,363 so as to contain 1.5% by weight sulfur and 29% by weight chlorine. A benzene solution containing 355 parts of the chlorosulfonated polyethylene (10% by weight) is refluxed with 200 parts of methanol and 60 parts of monoethanolamine for 30 minutes at normal atmospheric pressure. The monoethanolamine salt of the chlorosulfonated polyethylene is then precipitated by adding to the refluxed mixture an equal volume of methanol. The precipitate is dissolved in enough tetrahydrofuran to yield a 20% by weight solution. The product is reprecipitated by adding an approximately equal volume of methanol containing 10% by weight water to precipitate essentially all the solid, followed by a saturated solution of sodium chloride in water to complete the precipitation. Sodium is thereby introduced into the salt product in place of a portion of the ethanolamine. The precipitate is separated and in the form of a fine crumb is washed several times with water and dried in vacuo. The mixed salt of the chlorosulfonated polyethylene contains 0.42% by weight nitrogen and 0.39% by weight sodium, the ratio of amine to sodium being about 2 mols per atom of sodium. The mixed salt product (75 parts) is dissolved in 530 parts of tetrahydrofuran. To the resulting solution is added with stirring 100 parts of water and then 79 parts of methanol, a milky opalescence forming. The opalescent solution is then distilled at a pressure of about 20 millimeters of mercury until all the organic solvent, including a portion of the water, has been removed. A stable, uniform latex-like aqueous dispersion containing 51% by weight solids and having a Brookfield viscosity of 122 centipoises remains. The particle size of the dispersion is in the range of 0.2 to 4.0 microns.

The above latex-like dispersion, after dilution with water to 37% by weight solids, is used in making a white house paint. The paint is prepared by dispersing 55.2 parts of titanium dioxide, 16.9 parts of asbestine, and 16.9 parts of ground mica with stirring at high shear in 74.6 parts of the diluted latex containing 0.6 part of a 37% ammonia solution, 2 parts of sodium polyacrylate as thickener, 10 parts of a non-ionic polyethyleneoxide octylphenyl ether as a surface-active agent, and 3 parts of potassium tripolyphosphate. More diluted dispersion (91 parts) is added to the above dispersion together with 8 parts of a 5% solution of methyl cellulose in water and 60 parts of water. The prepared paint is compared as an isolated film with a film of a similarly pigmented house paint prepared with an aqueous polyacrylate base. When stretched at the rate of 2% per minute until breaking occurs, the prepared paint shows an elongation of 52% against 3.5% of the control. The improvement in elongation of the paint using the latex-like dispersion of this invention becomes more significant when the paint and the above-described control paint are applied over a weathered linseed oil house paint (on flat grain yellow pine) which has been exposed to weathering until flaking has begun. The paint made from the latex-like dispersion shows essentially no cracking upon exposure to further accelerated weathering conditions for 700 hours. The paint made from the latex-like dispersion of this invention when compared with the control paint also exhibits improved wearability and durability when applied over freshly primed red cedar, being unaffected by 1700 hours exposure in the accelerated test.

*Example II*

Polyethylene having a density of 0.922 and a melt index of 100 is chlorosulfonated as described in U.S. Patent 2,586,363 so as to contain 1.6% by weight sulfur and 44% by weight chlorine. The chlorosulfonated polyethylene is reacted with monoethanolamine as described in Example I but no sodium chloride solution is used in the preparation of the salt and therefore the polyethylene sulfonate salt contains only ethanolamine as the cationic constituent. The ethanolamine salt of the chlorosulfonated polyethylene is made into a uniform, stable, latex-like aqueous dispersion by the procedure described in Example I. A film laid down from the latex-like dispersion has properties similar to the chlorosulfonated polyethylene starting material from which it was made, i.e., it dries rapidly to give a hard, glossy, tackfree surface. The particle size of solids in the dispersion range from 0.2 to 4.0 microns.

*Example III*

Chlorosulfonated polyethylene prepared as described in Example I is reacted under pressure in an autoclave with an excess of monoethylamine in place of the monoethanolamine, the ethylamine being the only cationic constituent. A latex-like aqueous dispersion is then prepared as described in Example I, a stable, uniform dispersion similar to that example being obtained.

*Example IV*

Example III is repeated using an excess of ammonium hydroxide under pressure in an autoclave in place of the monoethylamine. A stable, uniform latex-like aqueous dispersion similar to that described in Example III is obtained.

*Example V*

Eight hundred parts of chlorosulfonated polyethylene similar to that of Example I except that it contained 1.19% by weight sulfur and 27.5% by weight chlorine in 12,800 parts of carbon tetrachloride and 390 parts of methanol is refluxed at atmospheric pressure for a short period of time. To the refluxed mixture is added gradually with agitation a solution of 47.6 parts of sodium hydroxide dissolved in 40 parts of water. The resulting mixture is refluxed with agitation for 15 hours and is allowed to cool over a period of 0.5 hour to 50° C. The solution is then neutralized with 37 parts of glacial acetic acid. The resulting sodium salt of chlorosulfonated polyethylene is precipitated by adding methanol and the resulting rubbery coagulum is washed first with methanol and then water on a corrugated mill of the type used for washing rubber. The product is further purified by dissolution in a mixture of tetrahydrofuran and methanol (6:1 by volume) and reprecipitated by a mixture of methanol and water. The product is finally purified by stirring it with repeated portions of deionized water in a mixing device (e.g., a Waring Blendor) designed for breaking up of solid particles with rapid agitation. After drying, the product contains 1.0% by weight of sodium and less than 0.02% by weight of ionizable chlorine. A solution of 690 parts of this product in 3,500 parts of tetrahydrofuran and 800 parts of methanol is treated with stirring with 30 parts of water, the solution becoming somewhat milky. There is then added to the milky solution a mixture of 237 parts of methanol and 75 parts of water, followed by a mixture of 1110 parts of methanol and 700 parts of water. The organic solvents and a small part of the water are then removed by distillation at 35 mm. pressure giving a stable latex-like aqueous dispersion containing 47% by weight of the sodium salt, most of the latex-like particles being between 0.15 and 0.5 micron in diameter. This latex-like dispersion gives films on evaporation of the water which are clear and almost colorless. The tensile strength of the film without curing or pigmentation is 2240 pounds per square inch, the modulus at 300% elongation is 600 pounds per square inch, the elongation at break is 730% and the permanent set is 10%. In comparison, a pigmented and cured film of the chlorosulfonated polyethylene from which the above latex-like dispersion was derived shows a tensile strength of 2150 pounds per square inch, a modulus at 300% elongation of 1340 pounds per square inch and an elongation at break of 515%.

*Example VI*

Chlorosulfonated polyethylene (polyethylene density 0.96) containing 0.97% by weight sulfur and 35.4% by weight of chlorine is made into the sodium salt by dissolving 600 parts of the chlorosulfonated product in 7900 parts of benzene containing 475 parts of methanol and refluxing for 4.5 hours with 29 parts of sodium hydroxide in 30 parts of water. The reaction product is then neutralized with glacial acetic acid and the sodium salt is isolated as described in Example V. The product contains 0.78% by weight of sodium and less than 0.02% by weight of ionizable chlorine. An aqueous dispersion is prepared by dissolving 600 parts of the salt in 6050 parts of tetrahydrofuran, 673 parts of methanol, and 35 parts of water. To this is added with stirring at room temperature in succession, a mixture of 1140 parts of methanol and 75 parts of water, then a mixture of 395 parts of methanol and 125 parts of water, and finally a mixture of 258 parts of methanol and 360 parts of water. The solvents are then removed as described in Example V, the resulting stable aqueous dispersion containing 49% by weight of the sodium salt in the form of particles essentially all of which are between 0.02 and 0.40 micron in diameter. Films formed from this dispersion by evaporation of water but without curing reflect the solvent resistance and excellent rubbery properties developed in the starting material by curing.

Similar results are obtained when the aqueous dispersions are made by the procedure described in Examples V and VI using equivalent amounts of lithium and potassium hydroxide in place of the sodium hydroxide.

*Example VII*

To a solution containing 400 parts of the mixed sodium hydroxyethyl ammonium salt described in Example I and 2660 parts of tetrahydrofuran is added with stirring 1000 parts of water and 395 parts of methanol. The resulting slightly opalescent solution is concentrated in vacuo to a thick, glue-like mass essentially free of organic solvents. The concentrate is diluted with sufficient water to give a slightly opalescent dispersion containing 39% by weight solids and having a Brookfield viscosity of 66 centipoises. The average particle size of solids in the dispersion is 0.06 micron. Using a solution of calcium chloride and calcium nitrate in a mixture of methanol and acetone as precipitant, the dispersion (without the addition of curing agents or pigments) readily forms essentially colorless dipped films. The aqueous dispersion when diluted after distillation with 10% by volume of xylene and 4% by volume of methanol yields films by the above-described dipping process having a tensile strength of 3300 pounds per square inch and an elongation of 320%.

*Example VIII*

The polymeric sodium salt of Example V (400 parts) is dissolved in 3550 parts of tetrahydrofuran. The resultant solution is treated first with 1720 parts of water and then with 266 parts of methanol. The mixture has a bluish, slightly opalescent appearance. The slightly opalescent mixture is vacuum distilled to remove organic solvents. The aqueous dispersion formed is stable and has solid particles which were determined by electron microscope measurement to be mostly within the range of 0.001 to 0.01 micron. The aqueous dispersion dries rapidly to give a hard, glossy tack-free surface.

*Example IX*

The chlorosulfonated polyethylene of Example VI is converted to the monoethanolamine salt, as described in Example I, containing 0.41% nitrogen. A solution of 650 parts of this salt in 6670 parts of tetrahydrofuran is treated with 800 parts of water and 790 parts of methanol. The resulting milky mixture is reduced to half its volume by vacuum distillation, then treated with 790 additional parts of methanol, and further distilled until all the methanol and tetrahydrofuran and a small amount of water have been removed. There results a latex of pH 6.2, viscosity 128 centipoises and 52% solids, with about 70% of the particles between 0.20 and 0.65, about 20% between 1.0 and 2.2 and about 10% between 2.4 and 4.0 microns in diameter.

The chlorosulfonated polyethylenes used to prepare the sulfonic acid salts of this invention may be derived from normally solid polyethylenes of either linear or branched-chained structure. The density of such polyethylenes varies from about 0.91 for the highly branched material to 0.96 or higher for polymers that are almost entirely linear in structure. The molecular weight may also vary over a wide range within the limits set by the requirement that the polyethylene be solid at ordinary temperatures and that it be soluble in organic solvents, e.g., to give a solution of at least 1% concentration that is fluid below 125° C. Generally, however, it is more convenient to use the readily determined melt index as a measure of the size of the molecule rather than the actual molecular weight. The molecular weight is more difficult to determine and its actual value is sometimes questionable. The melt index is defined as the amount of melted polymer extruded at constant pressure and temperature in a given time through a standard orifice and is determined by method ASTM D–1238–57 given in the publications of the American Society for Testing Materials. Ordinarily the polyethylene used will have a melt index between about 0.5 and about 200. A low melt index corresponds to a high molecular weight and gives a chlorosulfonated polyethylene and a final product of low plasticity. On the other hand, a high melt index corresponds to a low molecular weight and a more plastic intermediate chlorosulfonated polyethylene and a more plastic final product. Thus the corresponding salt of the chlorosulfonated polyethylene sulfonic acid reflects the viscosimetric properties of the parent chlorosulfonated polyethylene and gives solutions of low viscosity when derived from polyethylene of lower molecular weight and higher melt index. The molecular weight distribution of the polyethylene, which is often expressed as the ratio of the weight average to the number average molecular weight, is not critical in the present invention. The chlorine content and sulfur content, the latter being a measure of the portion of chlorosulfonyl groups present, may vary within the range of 0.5 to 1.8% by weight sulfur and 10 to 48% by weight chlorine. Ordinarily, rubber-like properties are obtained only within these limits. With less sulfur than 0.5% by weight present, the desirable curing and stability effects are not attained. With a sulfur content, above 1.8% by weight, the products tend to be undesirably water sensitive. The preparation and isolation of the chlorosulfonated polyethylenes may be carried out by the various methods described in U.S. Patents 2,586,363 and 2,982,759. The effects of variation in chlorine and sulfur content, molecular weight, etc., of the chlorosulfonated polyethylene starting material (which in turn are reflected in the sulfonate salts derived from them) are discussed in the above patent and application.

The cationic portion of the salt used in the present invention may be either an alkali metal, i.e., sodium, potassium and lithium or may be ammonium or substituted ammonium, e.g., primary, secondary, tertiary, or quaternary substituted ammonium. The amine compound generally used is of the aliphatic series containing up to 18 carbon atoms and includes those with other substituents in addition to the preferred hydroxyl, e.g., chlorine, bromine and iodine, methoxy, ethoxy, etc. Examples of these amines include β-hydroxyethylamine, β-chloroethylamine, γ-methoxyethylamine, γ-ethoxyethylamine, ethylamine, triethylamine, dodecylamine, etc. The preferred salts are the sodium salt and those derived from monoethanolamine. Other useful salts include ammonium, di(2-hydroxyethyl)ammonium, ethyl ammonium, trimethyl ammonium and tetramethylammonium, unsaturated substituted ammonium compounds, e.g., allylammonium, etc., which give latices with analogous properties.

These salts are conveniently made by the reaction of the chlorosulfonated polyethylene with the appropriate basic material which may be the amine or the alkali metal hydroxide. In addition, carbonates, or other weak acid salt such as the acetate, may be used. An excess of the above materials is used in order to neutralize the hydrochloric acid formed as well as the polyethylene sulfonic acid.

The chlorosulfonated polyethylene reactant is generally dissolved in an aromatic hydrocarbon solvent or in a chlorinated solvent such as carbon tetrachloride. The alkaline reagent, if inorganic, is dissolved in water or in an alcohol. The lower alcohols such as methanol, ethanol and isopropanol are particularly useful since they not only act as common solvents and increase the solvent power of the hydrocarbon or chlorinated hydrocarbon but also appear to assist in the reaction by forming esters of the chlorosulfonated polyethylene. The esters are subsequently hydrolized to free acids, which are then neutralized by the basic material present.

The positive ion of the salt may be replaced completely or partially by other ions by treatment with an excess of the salt of the ion to be introduced. This forms a convenient method for making some of the salts, particularly the mixtures of sodium ethanolamine salt.

In order to be suitable for the formation of the dispersions of this invention, the chlorosulfonate salts must be largely freed of other salts formed during their preparation. This may be done by precipitating the chlorosulfonate salts from the solutions in which they are formed, for example, by adding a relatively large volume of an alcohol of the type described above. The precipitated polymeric salt may then be further purified by being redissolved in a solvent such as benzene or tetrahydrofuran and being reprecipitated by means of an alcohol. Sometimes the by-product salts are insoluble in the organic solvent mixtures in which the polymeric salts are made and may be largely removed by simple filtration before further purification by the precipitation method described above. An alternative method for removing by-product salts is by the use of solid ion exchange agents. A third method of purification is by diffusion, e.g., through a semipermeable membrane.

No surface-active or dispersing agent is added in making the aqueous dispersion and, in fact, such agents if present cause coagulation while the bulk of the solvent is being removed. Dispersing agents, for example, of the sulfonate, sulfate, and carboxylate types, may be added to the final dispersion to reduce its viscosity and further increase its storage life. Even without such agents, however, aqueous dispersions have inherently good stability. Examples of suitable surface-active agents which can be added to the aqueous dispersions include: polyoxyethylene sorbitan monolaurate, polyoxyethylene sorbitan monooleate, dodecyl phenylpolyglycol ether, the sodium salt of the ½ sulfuric acid ester 2-methyl-7-ethyl undecanol-4, high molecular weight carboxylic acid esters, alkyl aryl polyether alcohols such as octylphenyl ether of polyethylene glycol and the sulfonated long-chain alcohols. In addition, salts of long-chain fatty acids such as the potassium salt of dimerized linoleic acid, salts of polynuclear carboxylic and sulfonic acids, e.g., the sodium salts of rosin and of dinaphthylmethane disulfonic acid and salts of long-chain alkylbenzene sulfonic acids, such as the sodium salt of decyl benzene sulfonic acid, can be used.

The resulting dispersions of this invention are particularly useful in the fields of coating, impregnating, and film-forming agents. Thus they may be used for making self-supporting films which reflect the viscosimetric properties of the starting material, for the impregnation of paper, cloth or other porous material and for the coating of surfaces. The coated articles due to their resistance to ozone are useful outdoors or near electrical equipment. The latex-like dispersions with particles of 0.02 to 4.0 microns in diameter are particularly useful as paint and lacquer vehicles.

An advantage of this invention is that the aqueous dispersions are extremely stable. This is particularly surprising since no surface-active or dispersing agents are added in their preparation. Another advantage of this invention is that the particle sizes of solids in the aqueous dispersion can be controlled within the limits of 0.001 to 4.0 microns. Still another advantage is that the aqueous dispersions, without heating, rapidly form flexible, coherent films having physical and chemical properties similar to those obtained from the original chlorosulfonated polyethylene starting material only by curing and adding pigments. Yet another advantage is that the process is simple and effective. Still other advantages will be apparent to those skilled in the art.

The embodiments of the invention in which an exclusive property of privilege is claimed are defined as follows:

1. A process for preparing an aqueous dispersion which comprises dissolving in tetrahydrofuran a salt of a polyethylene sulfonic acid derived by hydrolysis from a chlorosulfonated polyethylene containing 0.5 to 1.8% by weight sulfur and 10 to 48% by weight chlorine, the cationic constituent of said salt being selected from the group consisting of lithium, sodium, potassium, ammonium and substituted ammonium, adding, in at least one increment, water and a precipitant compound miscible with and more volatile than water selected from the group consisting of methanol, ethanol, isopropanol and acetone in an amount to form an opalescence but less than that required to form a precipitate, and distilling off said solvent and said precipitant compound to form an aqueous dispersion.

2. A process as defined in claim 1 wherein the cationic constituents of said salt are sodium and hydroxyethylammonium.

3. A process as defined in claim 1 wherein said precipitant is methanol.

4. A process as defined in claim 1 wherein at least one pigment is added to said aqueous dispersion.

5. A process as defined in claim 1 wherein said aqueous dispersion contains solid particles ranging from about 0.001 to 4.0 microns in diameter.

6. A process for preparing a latex-like aqueous dispersion which comprises dissolving in tetrahydrofuran a salt of a polyethylene sulfonic acid derived by hydrolysis from chlorosulfonated polyethylene containing 0.5 to 1.8% by weight sulfur and 10 to 48% by weight chlorine, the cationic constituent of said salt being selected from at least one member of the group consisting of sodium, potassium, lithium, ammonium, and substituted ammonium, adding 6 to 60% by weight of water, and in subsequent increments, water and a precipitant compound miscible with and more volatile than water selected from the group consisting of methanol, ethanol, isopropanol and acetone, the ratio of water to precipitant increasing with each successive increment, thereby forming a uniform, thick milky suspension, and distilling off said tetrahydrofuran and precipitant.

7. A process as defined in claim 6 wherein said precipitant compound is present in the tetrahydrofuranpolyethylene sulfonic acid salt solution in an amount less than that required to form a precipitate prior to the addition of the water increment.

8. A process as defined in claim 6 wherein said precipitant is present with said water increment in an amount less than that required to form a precipitate.

9. A process as defined in claim 6 wherein the cationic constituent of said salt is sodium.

10. A process as defined in claim 6 wherein said precipitant is methanol.

11. The stable aqueous dispersion prepared according to the process of claim 1.

12. The stable latex-like aqueous dispersion prepared according to the process of claim 6.

References Cited by the Examiner

UNITED STATES PATENTS

| 2,570,094 | 10/1951 | Bradley | 260—79.3 |
| 2,809,950 | 10/1957 | Bowers | 260—29.6 |
| 2,968,637 | 1/1961 | Bowers | 260—29.6 |

SAMUEL H. BLECH, *Primary Examiner.*

LEON J. BERCOVITZ, MURRAY TILLMAN,
*Examiners.*